Aug. 30, 1966 J. D. HEI 3,269,854
PROCESS OF RENDERING SUBSTRATES CATALYTIC TO ELECTROLESS COBALT DEPOSITION AND ARTICLE PRODUCED
Filed May 16, 1963
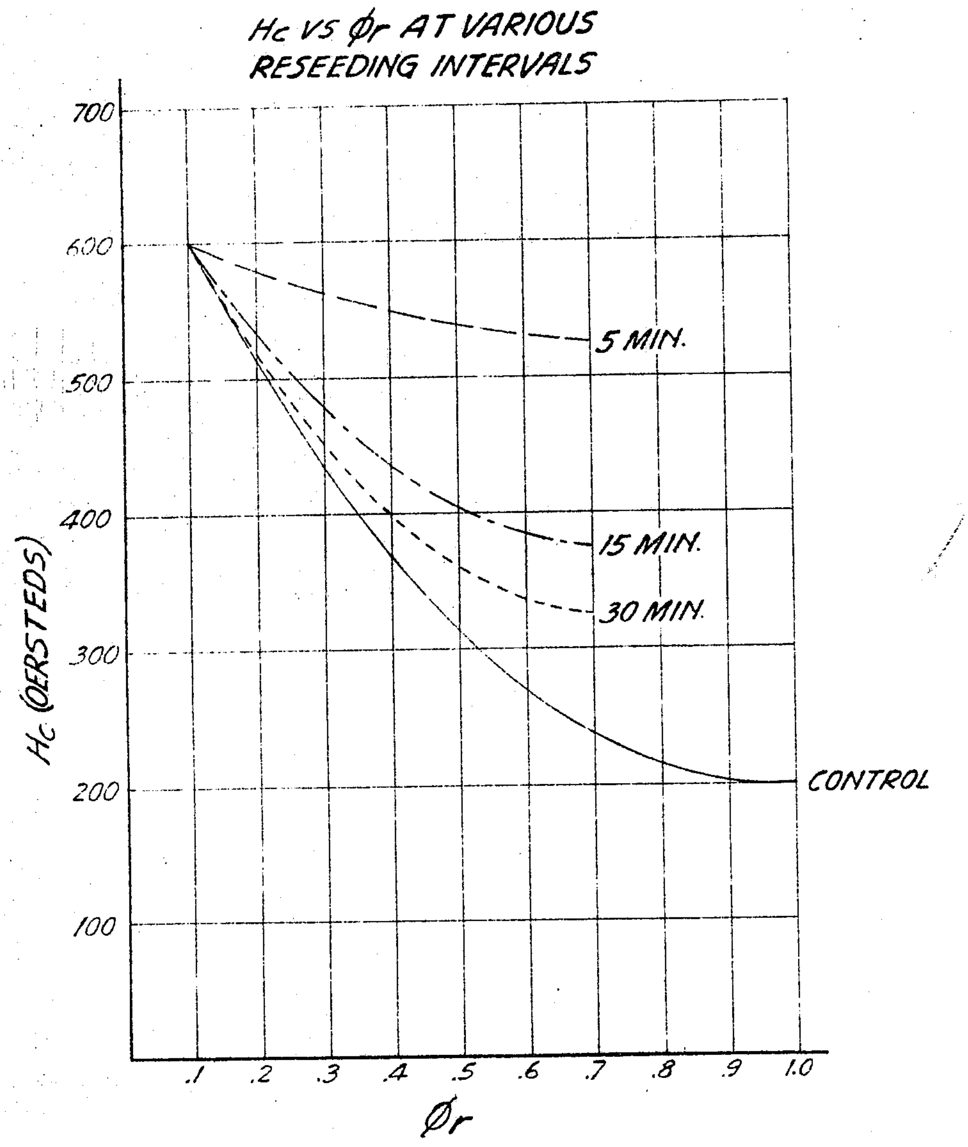
INVENTOR.
JACOB D. HEI
BY
Carpenter, Abbott, Coulter & Kinney
ATTORNEYS United States Patent Office 3,269,854
Patented August 30, 1966

3,269,854
PROCESS OF RENDERING SUBSTRATES CATALYTIC TO ELECTROLESS COBALT DEPOSITION AND ARTICLE PRODUCED

Jacob D. Hei, St. Paul, Minn., assignor to Minnesota Mining and Manufacturing Company, St. Paul, Minn., a corporation of Delaware Filed May 16, 1963, Ser. No. 280,940
9 Claims. (Cl. 117—47)

This invention relates to chemically reduced cobalt films on various substrates. In one aspect, this invention relates to chemically reduced cobalt coatings on plastic films suitable for use as magnetic information storage media. In still another aspect, this invention relates to the preparation of a new and useful magnetic recording tape or film having unique magnetic properties.

Although acicular iron oxide has been widely adopted in the form of finely divided particles, deposited as a thin coating on flexible substrates, for use in magnetic information storage media, considerable work has been conducted in an effort to find other suitable magnetic materials with improved or different properties. The magnetic properties of cobalt films prepared by electroless deposition techniques have been evaluated for use in high density digital recording, such results being reported in the Journal of the Electrochemical Society (August 1961) on page 174C, including mention of the influence of such factors as bath pH, agitation, and rate of deposition on the magnetic properties. Electroless metal deposition refers to the chemical deposition or plating of an adherent metal coating on a suitable substrate without the use of an external source of electrical current. The electroless plating of cobalt onto a metallic substrate is described in United States Patent No. 2,532,-284, using an aqueous solution of a cobalt salt and a relatively low concentration of a hypophosphite reducing agent as a bath for the autocatalytic deposition process. United States Patent No. 2,871,142 shows a method for maintaining the cobalt concentrations of the plating bath and of removing detrimental ions from the spent plating solution with a cation exchange column. It has been stated that the coercive force $H_C$ of chemically reduced cobalt films on polyethylene terephthalate can vary from 200 oersteds to 600 oersteds, the magnitude for a specific coating thickness depending on the grain development and grain size of the film. However, the coercive force $H_C$ of the electroless cobalt layer decreases rather rapidly as the residual flux $\phi_r$ increases with increasing layer thickness, thus tending to adversely affect the high frequency response characteristics of magnetic recording tape as the thickness is increased to improve the maximum reproducible low frequency signal strength.

It is therefore an object of this invention to provide an improved electroless magnetic information storage media.

Another object of this invention is to provide a magnetic recording tape having high linear storage capacity and having high remanence with high coercivity.

Still another object of this invention is to provide a magnetic recording tape having relatively square hystereis loop characteristics.

A further object of this invention is to provide an electroless coated metal film having a smoother surface at higher coating thicknesses than conventional electroless coated metal films.

Yet another object of this invention is to provide an electroless plating process for preparing metal coated substrates, especially for use as magnetic information storage media.

Still other objects and advantages will be apparent from the following disclosure.

In accordance with this invention, the magnetic information storage medium comprises a substrate having a thin, continuous metallic cobalt magnetic layer bonded to one surface thereof, microscopic catalytic metal, e.g. palladium, grains at the interface between the substrate and the cobalt layer, and at least one strata of microscopic catalytic metal grains in the cobalt layer. For magnetic recording tape applications, the substrate can be selected from a variety of insulating materials, preferably such flexible plastics as cellulose acetate, polyethylene terephthalate, etc.

Various methods for preparing an electroless chemical deposition of cobalt on insulative, semiconductive and conductive substrates are described in United States Patents Nos. 2,532,284, 2,871,142 and 3,011,920. In one technique, the steps involve cleaning the substrate surface, treating the surface by immersion in a bath containing stannous chloride or other stannous salt, seeding or catalyzing to provide catalytic nucleating centers by immersion in a salt of a metal catalytic to the deposition of the desired metal coating such as silver nitrate or the chlorides of gold, palladium or platinum, these metal ions being reduced to catalytic metal nucleating centers by the stannous ions adsorbed on the substrate and/or by reducing agents contained in the electroless metal deposition bath, and thereafter depositing the cobalt by treating the catalyzed surface with a cobalt salt plus a reducing agent therefor. In another technique, the clean substrate surface is treated with a bath containing colloidal particles of a catalytic metal and thereafter plating the substrate by treatment with the electroless cobalt plating solution. The bath containing colloidal particles of the catalytic metal may contain a protective colloid and/or a deflocculating agent, which can be removed from the substrate surface by means of a suitable solvent before the electroless deposition step. Among the various metals known to be catalytic to the electroless deposition of cobalt are copper, beryllium, aluminum, carbon, tungsten, tellurium, platinum, cobalt, silver, boron, thallium, vanadium, titanium, nickel, gold, germanium, silicon, molybdenum, selenium, iron, tin and palladium, with the metals copper, nickel and especially palladium being preferred. For the purpose of this invention, the particular technique employed to bond the electroless cobalt layer to the substrate is not critical.

To achieve the advantages of this invention, it has been found necessary to interrupt the electroless cobalt deposition at least once to deposit catalytic metal particles thereon before continuing the electroless cobalt deposition. Although the actual mechanism is not fully understood, the renewing of the active or catalytic sites intermittently during the electroless cobalt plating results in increased values of $H_C$ for a given coating thickness, or a given value of $\phi_r$, as compared to a coating prepared by the continuous, uninterrupted electroless deposition of cobalt, as is illustrated in the following example.

Several brass rods were dipped into an aqueous palladium chloride bath of the following composition:

| | |
|---|---|
| Palladium chloride | 0.1 gram per liter. |
| Hydrochloric acid | 1.0 milliliter per liter. |

Using an electroless cobalt plating bath of the following composition: $CoSO_4 \cdot 7H_2O$, 30 grams per liter; $NH_4Cl$, 50 grams per liter; potassium sodium tartrate, 75 grams per liter; $NH_4OH$ (29%), 40 grams per liter; sodium hypophosphite, 40 grams per liter, the brass rods were placed in this electroless bath and allowed to plate. The first rod, serving as a control sample, was permitted to plate without interruption. The other brass rods were allowed to plate with interruptions to re-expose the surface to the aqueous palladium chloride solution at various intervals of 5, 15, 30 and 60 minutes. Measurements were made to determine the value of $H_C$ at various values of $\phi_r$. If the intervals were decreased, providing more strata of palladium in the growing cobalt layer, the $H_C$ at a given value of $\phi_r$ is also increased, as shown in the accompanying figure. Although the value of $H_C$ tends to level off at increasing coating thickness, it was observed that the cobalt layers containing frequent palladium strata tends to level off at higher values of $H_C$. By renewing the palladium sites each 5 minutes, a brass rod was plated to 0.70 line $\phi_r$ and 525 oersteds coercive force. The hysteresis loops of those samples having a plurality of palladium strata more closely approximated a square configuration, and the resultant surface of the thicker coatings is noticeably smoother than the control sample. The combination of high coercivity, square hystereis loop and smooth exposed surface is particularly desirable in the preparation of a magnetic information storage medium, e.g. magnetic recording tape, where both good high and low frequency response is important. In general the magnetic information storage media of this invention have coercivities above about 400 oersteds.

Various other embodiments of the present invention will be apparent to those skilled in the art without departing from the scope thereof.

I claim:

1. A magnetic information storage medium comprising a substrate having a thin, continuous, metallic cobalt magnetic layer bonded to one surface thereof, microscopic grains of a metal catalytic to an electroless cobalt plating solution at the interface between said substrate and said cobalt layer, and at least one strata of microscopic grains of a metal catalytic to an electroless cobalt plating solution in said cobalt layer.

2. A magnetic information storage medium comprising a substrate having a thin, continuous, metallic cobalt magnetic layer bonded to one surface thereof, microscopic grains of a metal catalytic to an electroless cobalt plating solution at the interface between said substrate and said cobalt layer, and at least one strata of microscopic metallic palladium grains in said cobalt layer.

3. The magnetic storage medium of claim 2 in which said substrate is a flexible plastic.

4. The magnetic storage medium of claim 2 in which said substrate is a thin polyethylene terephthalate film.

5. The magnetic storage medium of claim 2 in which said substrate is a thin cellulose ester film.

6. A method for preparing a magnetic information storage medium which comprises:

(a) chemically depositing on a substrate surface catalytic grains of a metal catalytic to an electroless cobalt plating solution, (b) contacting said treated surface with an electroless cobalt plating solution and chemically plating metallic cobalt thereon, (c) chemically depositing catalytic grains of a metal catalytic to an electroless cobalt plating solution on the cobalt plated surface, and (d) contacting said treated cobalt plated surface with an electroless cobalt plating solution and chemically plating metallic cobalt thereon.

7. The process of claim 6 in which the catalytic metal is palladium.

8. In a process for the electroless cobalt deposition on a substrate containing catalytic grains of a metal catalytic to an electroless cobalt plating solution thereon, the improvement which comprises interrupting said electroless cobalt deposition at least once to deposit catalytic grains of a metal catalytic to an electroless cobalt plating solution thereon before continuing said electroless cobalt deposition.

9. The process of claim 8 in which the catalytic metal is palladium.

References Cited by the Examiner

UNITED STATES PATENTS

| | | | |
|---|---|---|---|
| 2,968,578 | 1/1961 | Mochel. | |
| 3,116,159 | 12/1963 | Fisher et al. | 117—71 |
| 3,138,479 | 6/1964 | Foley. | |

ALFRED L. LEAVITT, *Primary Examiner.*

RICHARD D. NEVIUS, *Examiner.*

J. R. BATTEN, Jr., *Assistant Examiner.*